Nov. 8, 1955  A. W. GARDES  2,723,058
SNUBBER DEVICE FOR A WEIGHING HOPPER
IN A FIBER HANDLING MACHINE
Filed April 13, 1951
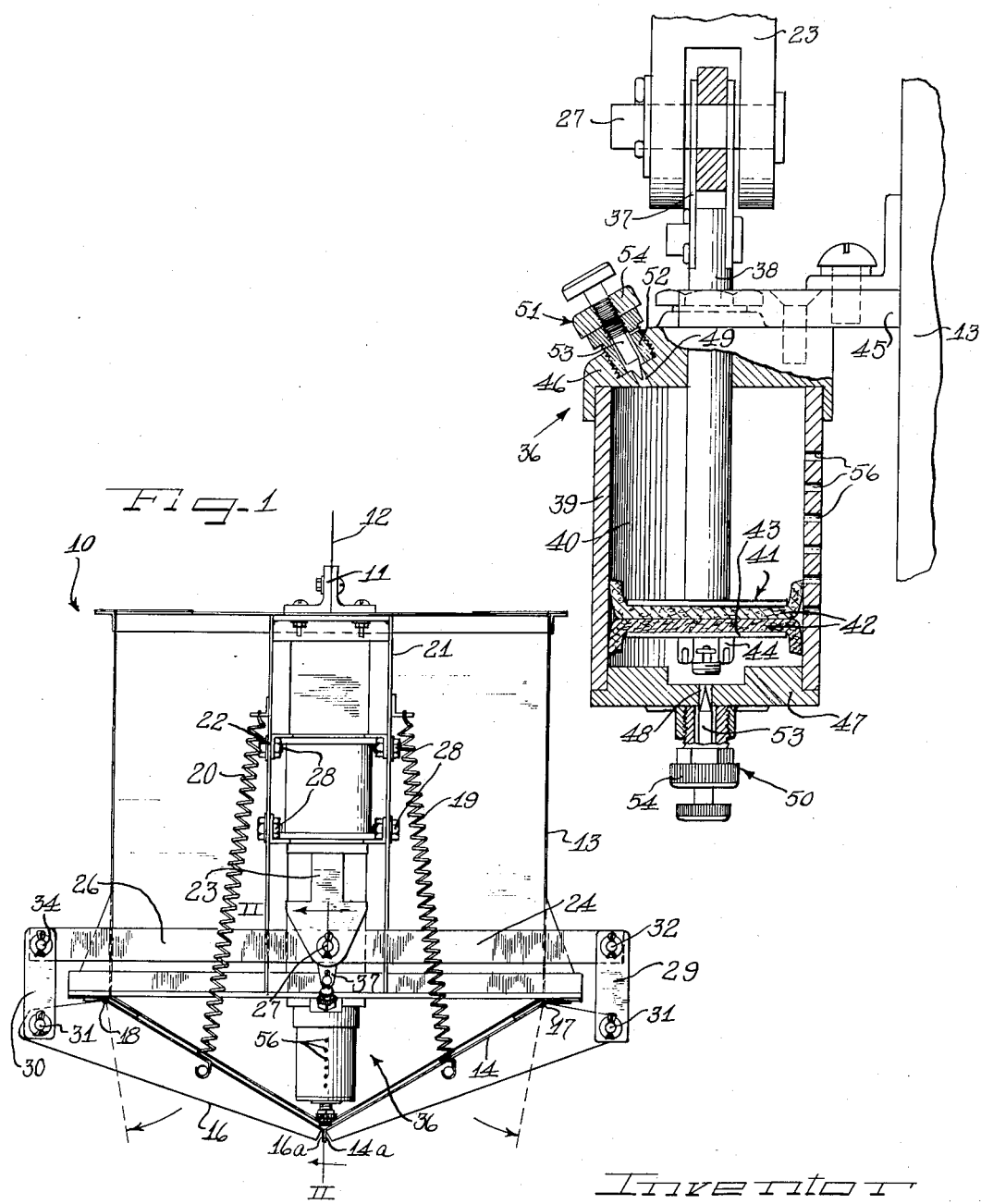
Inventor
Alfred W. Gardes

United States Patent Office 2,723,058
Patented Nov. 8, 1955

2,723,058

SNUBBER DEVICE FOR A WEIGHING HOPPER IN A FIBER HANDLING MACHINE

Alfred W. Gardes, Detroit, Mich., assignor to Houdaille-Hershey of Indiana, Inc., a corporation of Indiana Application April 13, 1951, Serial No. 220,945

11 Claims. (Cl. 222—504)

This invention relates generally to a door construction for a hopper and more particularly to a checking device for closely controlling and regulating the opening and closing movements of a motor-actuated hopper door construction.

Although it will be observed that the principles of the present invention are of general utility, it may be noted that the hopper door construction disclosed herein finds a particularly useful application when employed in connection with a weighing hopper of a fiber handling machine such as described in the copending application of Bernard E. O'Connor and Robert E. King, Serial No. 91,772, filed May 6, 1949, now Patent No. 2,660,393, issued November 24, 1953. In a mechanism as therein described, small increments of textile fibers are automatically weighed in a fiber handling and weighing machine, and a predetermined quantity of fiber is discharged onto a conveyor whereupon the fibers are subsequently blended for delivery to the picker room of a textile mill.

In order to promote the necessary accuracy in blending and mixing, it is essential that the fiber feeding and weighing machines deliver accurately weighed quantities of fibers at regular intervals. In the machines provided for this purpose, advantageous use has been made of motor-driven hopper doors normally spring-biased to a closed position and electrically controlled so that the proper interlocked regulation may be effected between a plurality of fiber handling machines arranged in battery.

One of the particular difficulties encountered in the use of such machines has been the destruction and deterioration of the weigh box components by virtue of the slamming action occurring upon actuation of the hopper doors.

According to the principles of the present invention, an improved checking mechanism is provided and has a driven connection with the door actuating means so as to be operated in unison with the opening and closing of the hopper doors.

In the exemplary construction herein provided, a closed cylinder is provided to reciprocably house a movable piston operable to compress air in the respective ends of the cylinder, thereby to control the opening and closing of the hopper door elements. A bleeder opening is provided in each end of the closed cylinder and an adjustable needle valve is used to control the flow of air through the bleeder opening so that the stop position of the door elements may be selectively adjusted. The cylinder is further provided with a plurality of aligned spaced apertures in the walls thereof which are arranged to substantially unload the piston at the medial portion of the stroke thereof.

The adjustability of the opening and closing movements of the hopper door construction afforded through the employment of the checking device herein disclosed results in an improved sensitivity of operation greatly contributing to the effective operation of the weigh box mechanism.

It is an object of the present invention, therefore, to provide an improved hopper door construction incorporating a checking mechanism to adjustably control the opening and closing movements of the hopper doors.

Another object of the present invention is to provide an improved double-acting checking device by means of which hopper doors may be prevented from slamming against the bottom of a hopper weigh box.

Another object of the present invention is to provide an improved hopper door construction incorporated a checking device to prolong the effective life of the hopper components.

Many other features, advantages and additional objects of the present invention will become manifest to those versed in the art upon making reference to the detailed description which follows and the accompanying sheet of drawings in which a preferred structural embodiment of a hopper door construction constructed in accordance with the principles of the present invention is set forth.

On the drawings:

Figure 1 is an end elevational view of a hopper-type weigh box including a hopper door construction provided in accordance with the principles of the present invention; and Figure 2 is an enlarged fragmentary cross-sectional view, with parts shown in elevation and with parts broken away, to illustrate additional details of construction, and taken substantially on line II—II of Figure 1.

As shown on the drawings:

In Figure 1 is shown a hopper-type weigh box indicated generally by the reference numeral 10. The weigh box is of the type advantageously used in connection with a fiber handling machine similar to that disclosed and claimed in the co-pending application of Bernard E. O'Connor and Robert E. King, Serial No. 91,772, filed May 6, 1949. It will be noted that the weigh box 10 is provided with support angles 11 clamping one end of a suspension strap 12 by means of which the weigh box 10 may be pivotally suspended from the weigh bar of a weighing mechanism commonly employed in fiber-handling machines of the type referred to.

The weigh box 10 comprises a rectangular metal shell 13 open at the top to thereby constitute a hopper for receiving quantities of material such as textile fibers therein. The bottom of the shell 13 is also open to provide a discharge opening through which the fibers received in the weigh box 10 may be delivered. To control the flow of material through the discharge opening at the bottom of the shell 13, a hopper door construction is provided including a pair of doors 14 and 16, respectively.

The doors 14 and 16 preferably comprise plates of sheet metal, each being respectively hinged to a pivot rod 17 or 18 so that the doors 14 and 16 may be pivotally moved into abutting engagement with one another to close the discharge opening at the bottom of the shell 13. It will be noted that the respective doors 14 and 16 are provided with a flange 14a and 16a, respectively, which abuttingly contact one another when the doors are in closed position.

Resilient means are provided to normally load the doors 14 and 16 toward closed position, and in this embodiment the resilient means takes the form of a spring 19, each being connected at one end to a subframe 21 integrated with the shell 13 of the weigh box 10 and at the other end to the doors 14 and 16, respectively.

To selectively open the doors 14 and 16, a motor-driven leverage system is provided, the motor taking the form of a solenoid 22 having a movable plunger 23 pivotally connected to oppositely extending links 24 and 26 by a pivot pin 27. It will be noted that the solenoid 22 is secured in firm assembly with the subframe 21 by means of suitable fastening means 28.

A link 29 and a link 30 is provided at the end of the links 24 and 26, respectively, to establish a pivotal connection with the doors 14 and 16. The link 29 is connected to the door by a pivot pin 31 and to the link 24 by a pivot pin 32, while the link 30 is connected to the door 16 by means of a pivot pin 31 and to the link 26 by means of a pivot pin 34.

When the plunger 23 is drawn upwardly into the coil of the solenoid 22, the links 24 and 26 will be jackknifed and the motion thereof will be transmitted through the links 29 and 30 to the doors 14 and 16, tending to pivotally displace the doors 14 and 16 about the pivot rods 17 and 18, respectively, so that the doors 14 and 16 will be moved into generally dependent position relative to the weigh box 10 and the discharge opening in the bottom of the shell 13 will be opened.

To control the opening and closing of the doors 14 and 16 in accordance with the principles of the present invention, a checking mechanism indicated generally by the reference numeral 36 is provided. The checking mechanism 36 has a driving connection with the plunger 23 by means of a link 37 connected to the pivot pin 27 at one end and at the other end to a piston rod 38 forming a part of the checking mechanism 36.

Referring more particularly to Figure 2, the details of the checking mechanism 36 will be explained. A cylinder 39 is provided having a smooth bore 40 housing a piston 41 carried on the end of the piston rod 38. The piston 41 comprises, in this particular embodiment, a pair of oversized flexible washers 42 lapped in opposite directions and clamped between two retaining washers 43 by a nut 44 engageable with the threaded end of the piston rod 38.

The cylinder 39 is closed by means of a cover 46 and a cap 47 so that the movement of the piston 41 in the bore 40 of the cylinder 39 will operate to compress air in the respective ends of the cylinder 39, thereby tending to check the movement of the plunger 23 to which the piston rod 38 is connected. It will be apparent that the checking mechanism 36 is double acting in that a checking action will be produced regardless of the direction of the piston 41.

The cylinder 39 is stationarily mounted on the shell 13 of the weigh box 10 by means of a bracket 45 firmly connected to the cover 46.

A bleeder opening 48 is provided in the cap 47 and a bleeder opening 49 is provided in the cover 46 to relieve the pressure built up in the respective ends of the cylinder 39, thereby permitting the piston 41 to develop a full stroke.

In order to adjustably regulate the rate of flow of checking fluid through the bleeder openings 48 and 49, adjustable needle valves 50 and 51, respectively, are provided. Each of the valves 50 and 51 includes a bushing 52 having a flow passage formed therein and controlled by a needle stem 53 threaded into the bushing. A lock nut 54 is provided to lock the needle stem 53 in adjusted position.

The cylinder 39 is further provided with a plurality of aligned apertures 56 which are spaced apart from one another and which are arranged to substantially unload the piston 41 in the medial portions of its stroke. Thus, a relatively rapid stroke may be obtained with fully adequate checking action occurring as the piston 41 approaches the respective ends of its stroke.

By closely regulating the adjustment of the needle valves 50 and 51, the opening and closing movements of the doors 14 and 16 may be properly controlled to prevent slamming of the doors 14 and 16 against the shell 13 as well as against each other at the contact flanges 14a and 16a. Moreover, the outward stop position of the doors 14 and 16 may also be regulated to preclude the delivery of unusual stresses and strains to the door actuating mechanism, thereby prolonging the life of the hopper door components.

Although various minor structural modifications might be suggested by those versed in the art, it should be understood that I wish to embody within the scope of this patent all such modifications as reasonably and properly come within the scope of my contribution to the art.

I claim as my invention:

1. A weighing hopper adapted to receive fibers and having a discharge opening, a door pivotally mounted on said hopper adjacent said discharge opening, a spring connected to said door and to said hopper normally returning said door to a closed position relative to said opening, a motor driven linkage means connected to said door to selectively open said door against the bias of said spring, and a double-acting check device connected to said linkage to operate in unison with said door, said check device comprising a closed cylinder and a piston reciprocable therein, said cylinder having a bleeder opening in each end thereof, whereby the movement of said piston in forcing air through said bleeder openings will control the opening and closing of said door.

2. A weighing hopper adapted to receive fibers and having a discharge opening, a door pivotally mounted on said hopper adjacent said discharge opening, a spring connected to said door and to said hopper normally returning said door to a closed position relative to said opening, a motor driven linkage means connected to said door to selectively open said door against the bias of said spring, and a double-acting check device connected to said linkage to operate in unison with said door, said check device comprising a closed cylinder and a piston reciprocable therein, said cylinder having a bleeder opening in each end thereof, whereby the movement of said piston in forcing air through said bleeder openings will control the opening and closing of said door, and an adjustable needle valve in each of said bleeder openings to selectively vary the rate of flow of air for varying the checking characteristics of said check device.

3. A weighing hopper adapted to receive fibers and having a discharge opening, a door pivotally mounted on said hopper adjacent said discharge opening, a spring connected to said door and to said hopper normally returning said door to a closed position relative to said opening, a motor driven linkage means connected to said door to selectively open said door against the bias of said spring, and a double-acting check device connected to said linkage to operate in unison with said door, said check device comprising a closed cylinder and a piston reciprocable therein, said cylinder having a bleeder opening in each end thereof, whereby the movement of said piston in forcing air through said bleeder openings will control the opening and closing of said door, and an adjustable needle valve in each of said bleeder openings to selectively vary the rate of flow of air for varying the checking characteristics of said check device, said cylinder being further provided with a plurality of aligned spaced apertures in the walls thereof arranged to substantially unload said piston at the medial portion of its stroke.

4. In a hopper door construction, a pair of pivoted closure members engaging with one another when closing a hopper discharge opening, resilient means urging said closure members towards a closed position, actuating means to pivotally move said closure members apart from one another for opening the hopper discharge opening, and a double-acting check device driven by said actuating means in unison with said closure members to regulate the opening and to prevent slamming of said closure members, said check device including a closed cylinder and a piston reciprocable therein to compress air in the respective opposite ends of said cylinder, said cylinder having a bleeder opening in each end to relieve the pressure in the respective opposite ends of said cylinder.

5. In a hopper door construction, a pair of pivoted closure members engaging one another when closing a hopper discharge opening, resilient means urging said closure members towards a closed position, actuating means to pivotally move said closure members apart from one another for opening the hopper discharge opening, and a double-acting check device driven by said actuating means in unison with said closure members to regulate the opening and to prevent slamming of said closure members, said check device including a closed cylinder and a piston reciprocable therein to compress air in the respective opposite ends of said cylinder, said cylinder having a bleeder opening in each end to relieve the pressure in the responsive opposite ends of said cylinder, each of said bleeder openings being controlled by an adjustable needle valve to selectively regulate the flow of checking medium therethrough for controlling the opening and for preventing slamming of said closure members.

6. In a hopper door construction, a pair of pivoted closure members pivotally movable towards abutting engagement with one another for closing a hopper discharge opening, resilient means urging said closure members towards a closed position, actuating means to pivotally move said closure members apart from one another for opening the hopper discharge opening, and a double-acting check device driven by said actuating means in unison with said doors to regulate the opening and closing of said doors, said check device including a closed cylinder and a piston reciprocable therein to compress air in the respective opposite ends of said cylinder, said cylinder having a bleeder opening in each end to relieve the pressure in the respective opposite ends of said cylinder, each of said bleeder openings being controlled by an adjustable needle valve to selectively regulate the flow of checking medium therethrough for controlling the opening and closing of said door, said cylinder being further provided with a plurality of aligned spaced apertures in the walls thereof arranged to substantially unload said piston at the medial portion of its stroke.

7. In a hopper door construction, a pair of pivoted closure members engaging one another when closing a hopper discharge opening, resilient means urging said closure members towards a closed position, actuating means to pivotally move said closure members apart from one another for opening the hopper discharge opening, and a double-acting check device driven by said actuating means in unison with said closure members to regulate the opening and to prevent slamming thereof.

8. In a hopper door construction, a pair of pivoted closure members having abutting engagement with one another when closing a hopper discharge opening, resilient means urging said closure members towards a closed position, actuating means to pivotally move said closure members apart from one another for opening the hopper discharge opening, and a double-acting check device driven by said actuating means in unison with said closure members to regulate the opening and to prevent slamming thereof, said check device including adjustment elements to selectively regulate the opening and closing of said closure members by varying the checking characteristics of said check device.

9. In a weighing hopper having a motorized door means controlling a discharge opening, the improvement of a checking mechanism to control the movement of said door means, said checking mechanism including a closed cylinder and a piston adapted to be reciprocated through a predetermined stroke in said cylinder and in unison with the opening and closing of said door means, said cylinder having a plurality of aligned spaced apart apertures in the walls thereof intermediate the respective ends thereof and axially inwardly of the end positions of said predetermined stroke of said piston in said cylinder, said apertures being arranged to substantially unload said piston in the medial portion of its stroke, said cylinder being further provided with a bleeder opening in each end thereof and axially outwardly of the end positions of said predetermined stroke of said piston in said cylinder to relieve the pressure in said cylinder at the end of the stroke of said piston.

10. In a weighing hopper as defined in claim 9, an adjustable valve to control each of said bleeder openings to selectively adjust the rate of flow of checking medium through said opening for controlling the opening and closing of said doors.

11. A weighing hopper having a pivotally mounted door means arranged to open and close a discharge opening, and a checking mechanism for said door means comprising a closed cylinder connected to said hopper and a piston reciprocable in said cylinder and adapted to be reciprocated in unison with the pivotal movement of said door means, said cylinder havng a restricted aperture in each end thereof forming a bleeder opening to check rapid relative movement of said door means when nearly open and when nearly closed, and an adjustable needle valve for controlling each of said restricted apertures to selectively regulate the flow of checking medium through said bleeder openings for controlling the opening and closing of said door means, said cylinder being further provided with a plurality of aligned spaced apertures in the walls thereof arranged to substantially unload said piston at the medial portion of its stroke.

References Cited in the file of this patent

UNITED STATES PATENTS

| Number | Name | Date |
|---|---|---|
| 768,133 | Martin | Aug. 23, 1904 |
| 1,140,457 | Henry | May 25, 1915 |
| 1,218,434 | McGuire | Mar. 6, 1917 |
| 1,508,580 | Schoelkopf | Sept. 16, 1924 |
| 1,590,414 | Bosserdet | June 29, 1926 |
| 1,951,905 | Hansen | Mar. 20, 1934 |
| 1,978,093 | Roby et al. | Oct. 23, 1934 |
| 2,019,502 | Osgood | Nov. 5, 1935 |
| 2,138,936 | Osterberg | Dec. 6, 1938 |
| 2,513,215 | Strehlow | June 27, 1950 |
| 2,517,408 | Olcott | Aug. 1, 1950 |
| 2,611,465 | Simon | Sept. 23, 1952 |

FOREIGN PATENTS

| Number | Country | Date |
|---|---|---|
| 114,782 | Great Britain | Apr. 18, 1918 |